March 9, 1937.    L. DEMBOSKI ET AL    2,073,467
METHOD OF MAKING WELDING NUTS
Filed April 20, 1936
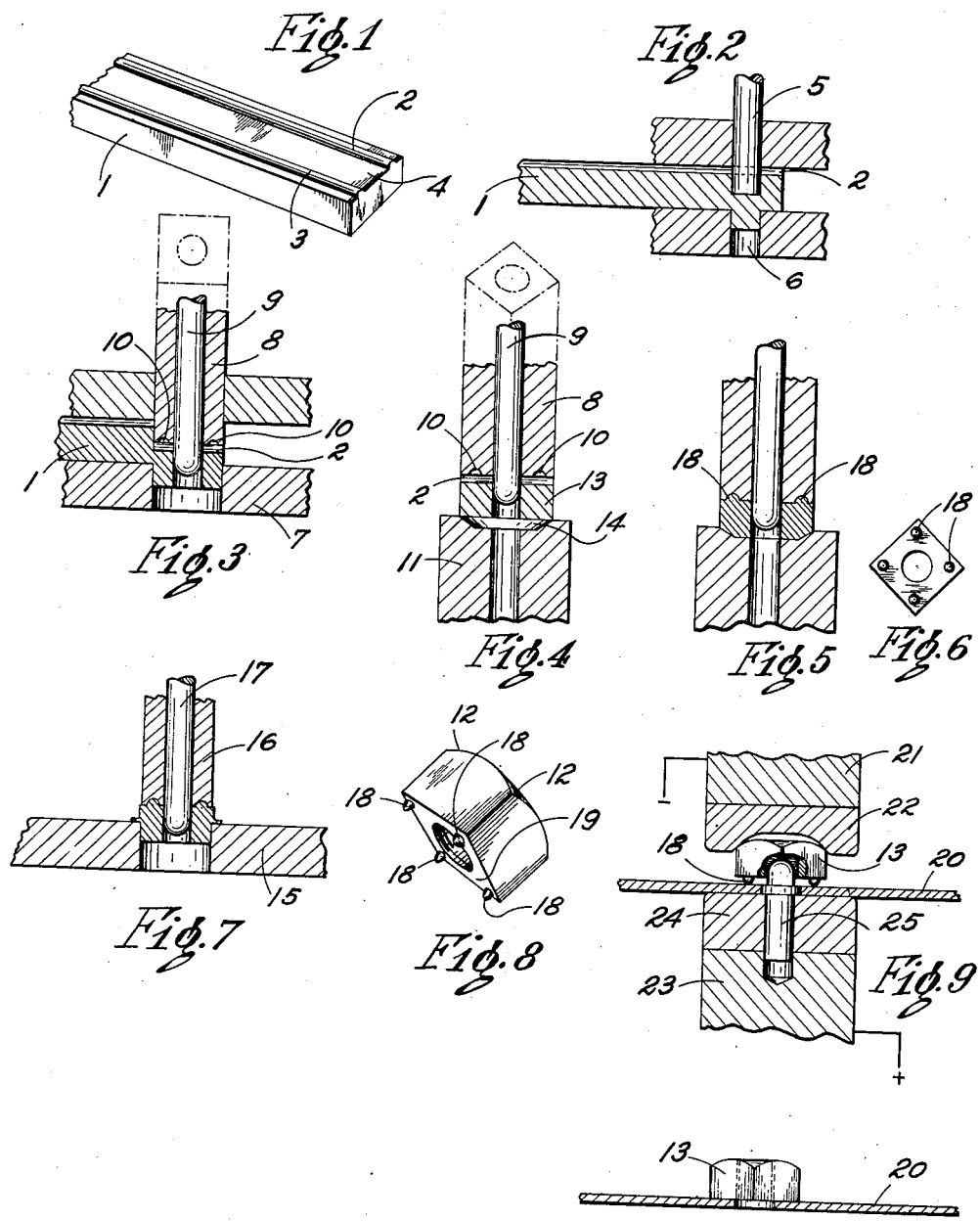
Inventor
LEO DEMBOSKI
& JOHN KAY
By Richey & Watts
Attorneys Patented Mar. 9, 1937

2,073,467

UNITED STATES PATENT OFFICE 2,073,467

METHOD OF MAKING WELDING NUTS

Leo Demboski and John Kay, Berea, Ohio, assignors to The Ohio Nut & Bolt Company, Berea, Ohio, a corporation of Ohio Application April 20, 1936, Serial No. 75,286

7 Claims. (Cl. 10—86)

This invention relates to an improved welding nut or the like and method of making the same. Our invention contemplates the rapid and economical manufacture of welding nuts or similar articles having a plurality of projections extending from a surface, which projections are adapted to be electrically welded to a base or supporting piece. It has been found advantageous, particularly in sheet metal work such as automobile bodies and the like, to weld or otherwise suitably secure a heavier piece of metal to the thin metal, the heavier metal being threaded to receive a screw. Such devices are commonly termed "welding nuts" although actually, inasmuch as they are securely fastened to a supporting member, they are not nuts in the sense that this term is used in the mechanical arts.

We are aware that bolts having projections or bosses on the underside or outside of their heads have been manufactured and that such bolts have been secured in position by causing the projections to be fused or welded to the supporting stock.

It is among the objects of our invention to provide a welding nut having a plurality of outwardly extending welding projections which welding projections are of uniform height whereby the nut may be properly welded in position; the provision of an improved method of making nuts of the type described whereby uniform articles may be accurately and rapidly produced.

The above and other objects of our invention will appear from the following description of one form of our improved product and one embodiment of our method, it being understood, of course, that both the product and method may be varied to suit varying conditions and to produce articles for various purposes.

Referring now to the drawing—

Figure 1 is a perspective view of a portion of the formed bar or blank from which our nuts are made.

Figure 2 is a diagrammatic illustration of the first step of the process in which the hole is punched.

Figure 3 is a view similar to Figure 2 but illustrating the second step in which the nut is severed from the bar.

Figure 4 illustrates the beginning of the third or projection forming and chamfering step.

Figure 5 is a view generally similar to Figure 4 but illustrating the end of the projection forming step.

Figure 6 is a plan view of the nut looking at the side which engages the support, as it appears after the step of Figures 4 and 5 is completed.

Figure 7 is a view generally similar to Figures 2, 3, 4 and 5 but illustrating the trimming operation for removing the flash or burr.

Figure 8 is a perspective view of the finished, tapped nut.

Figure 9 is a vertical cross-sectional view showing the nut partly in section and illustrating an arrangement of electrodes for welding the nut in position on sheet metal.

Figure 10 illustrates the nut as it appears after being welded in place.

The nut illustrated in the drawing is of a simple square form. It will be understood that hexagonal or other shapes might readily be made but the present description will be confined to the square nut. Bar or blank stock 1 (Fig. 1) is formed by rolling or any other suitable process and is provided with outwardly projecting ribs 2 and 3, preferably longitudinally extending although they could be formed transversely of the bar if desired. These ribs project from the surface 4 of the body of the bar 1 a distance equal to the distance the finished welding projection is from the finished nut. This bar 1 is fed longitudinally into a nut making machine of any desired type which is equipped with the proper dies. As the machine per se forms no part of the present invention it is not described or illustrated, it being sufficient to explain that the first operation which takes place is preferably the punching out of the hole. This is illustrated in Figure 2 in which a punching die 5 is adapted to be moved downwardly in the direction of the arrow and co-acts with an aperture 6 in the bottom die to punch out the hole which is later tapped to the proper thread.

After the punching operation, in the preferred practice of our method, the nut is severed from the bar stock 1, as is illustrated in Figure 3. The severing die preferably includes a bottom die member 7 having an aperture of the desired size and shape and an upper die member 8 which includes a locating pin 9 adapted to enter the hole which has previously been formed by the punch 5. As is seen in Figure 3 the face of the upper die member 8 is provided with cup shaped apertures 10. In forming the described square nut four of these apertures are provided, each being disposed in a corner of the die. During the shearing operation (Fig. 3) the face of the die 8 engages the top of the ribs 2 and 3 and co-acts with the bottom die 7 to shear the nut from the bar 1.

The next step in the process is to extrude or displace all of the metal of the ribs 2 and 3 except that which is allowed to remain to form the welding projections. This step is illustrated in Figures 4 and 5. These sectional views are taken on a line diagonally across the corners of the nut while Figure 3 illustrates a section taken on a line drawn parallel to one side of the nut. The bottom die 11 is formed with portions 14 which cause the corners of the nut to be chamfered, as is seen at 12 in Figure 8. The upper die 8 (Fig. 4) forces the nut 13 down into the chamfered recess 14 in the lower die 11. The guide pin 9 holds the nut in proper position relative to the dies and the pressure exerted on the die 8 causes the ribs 2 and 3 to be flattened out except where the apertures 10 occur in the face of the die 8. The chamfered portion of the bottom die 11 and the downward movement of the upper die 8 co-act to cause the surface of the nut 13 on which the welding projections are to be formed to be flattened and the ribs 2 and 3 reduced to the level of the surface of the nut blank.

Figure 5 illustrates the nut after this step has taken place except that, as will be understood, a certain amount of burr or flash will occur where the metal of the ribs 2 and 3 is flattened and where the corners of the nut are chamfered. In practice the lower die 11 may conveniently be disposed below the die 7 of Figure 3 and a single stroke of the die 8 will serve to sever the nut, chamfer the corners and form the welding projections. After the completion of these steps the nut, which is now finished except for removing the burr and threading the hole, may be pushed through a burr trimming die 15 (Fig. 7) by means of an upper die member 16 which includes a guide or centering pin 17. The hole in the nut may then be threaded in any suitable manner and the resulting product will be as illustrated in Figure 8.

By simultaneously forming the chamfer on the corners of one surface of the nut and squeezing down the ribs 2 and 3 on the other surface of the nut the depressions 10 in the die 8 are always completely and uniformly filled with metal so that each welding projection 18 of the finished nut will extend out from the surface 19 of the nut substantially exactly the same distance and each projection will have the same mass and form. It is important in devices of this type that these welding projections be of exactly the same dimensions so that they may be properly welded in place for use. If one projection is lower than the others it either will not be properly welded and the others may be subjected to too much heat and burn or the nut may not be parallel to the surface to which it is attached. Our improved process provides means for maintaining absolutely uniformity of the welding projections. Our improved product has proved to be readily adaptable to rapid and accurate production.

In Figure 9 we have illustrated one method of attaching the nut of Figure 8 to a metal sheet 20. The upper electrode is indicated at 21 and is provided with a cup shaped contact surface 22 which may be of suitable wear resisting material. As is seen from Figure 9 the member 22 only contacts with the nut 13 on the beveled corners thereof. The lower electrode 23 is also provided with a wear resisting contacting surface 24 which may be provided with a centering pin 25 to locate the nut 13 relative to the hole in the sheet 20. When current is applied across the electrodes 21 and 23 and the two electrodes are moved toward each other current will pass through each of the corner portions of the nut, the projections 18 and the sheet member 20. The projections will be heated to welding temperature and the pressure will cause them to be flattened and the nut to be seated on the sheet 20, as is illustrated in Figure 10. Preferably only the portions of the nut where the projections 18 occur are welded to the sheet and this is facilitated by the shape of the upper electrode 22 whereby contact is made with the nut only at relatively small areas directly above the welding projections 18. The shortest possible path is thus provided for the current and the body of the nut is not unnecessarily heated, resulting in a saving of current and in economical production.

By our improved process of making welding nuts and the like the metal of the welding projections is not substantially disturbed or cold worked during the nut forming operation. Therefore, this metal retains its original soft condition and is most suitable for welding. It will be understood by those skilled in the art that the drawing illustrating the steps of our method are merely diagrammatic and that in actual practice one or more of the steps might be combined in a single punching operation or in some cases the order in which the steps are performed might be modified. Therefore, although we have described in considerable detail the illustrated embodiment of our improved method and article, we do not wish to be limited to the particular article and steps of making same herein described, but claim as our invention all forms thereof coming within the scope of the appended claims.

We claim:
1. The method of making welding nuts or the like which includes the steps of forming a bar of stock having a longitudinally extending rib on one surface thereof, severing said bar into articles of the desired shape and flattening said rib except portions thereof which are permitted to remain substantially their original height to form welding projections.

2. The method of making welding nuts and the like of the type described which comprises subjecting a blank having a rib formed on one side thereof to pressure between die members, one of the die members being adapted to chamfer the corners of the article on one side thereof and the other die member being adapted to flatten said rib on the other side of the article except the portions disposed opposite said chamfered portions which are permitted to remain unflattened to form welding projections of uniform height.

3. The method of making welding nuts or the like which includes the steps of forming a bar of stock having spaced longitudinally extending ribs projecting from one surface thereof, punching and severing said bar into nut blanks and simultaneously flattening portions of said ribs, chamfering the corners of the nut on the side opposite said ribs and forming the unflattened portions of said ribs into welding projections.

4. The method of making welding nuts and the like of the type described which comprises subjecting a blank having a rib formed on one side thereof to pressure between die members, one of the die members being adapted to chamfer the corners of the article on one side thereof and the other die member being adapted to flatten said rib on the other side of the article except the portions disposed opposite said chamfered portions which are permitted to remain unflattened to form welding projections of uniform height, trimming the nut to remove burr and tapping the punched hole.

5. The method of making welding nuts or the like which includes the steps of forming a bar of stock having outwardly extending ribs on one side thereof, severing the bar into nut blanks, and flattening said ribs on said blanks except at portions thereof which are permitted to remain unflattened to form welding projections.

6. The method of making welding nuts or the like which includes the steps of subjecting a nut blank having a rib extending outwardly from one side thereof to pressure whereby a portion of said rib will be flattened and a portion thereof will be simultaneously formed into a welding projection.

7. The method of making welding nuts or the like which includes the steps of forming a bar of stock having ribs projecting from one surface thereof, punching and severing said bar into nut blanks and simultaneously flattening portions of said ribs, chamfering the corners of the nut on the side opposite said ribs and forming the unflattened portions of said ribs into welding projections.

LEO DEMBOSKI.
JOHN KAY.